(12) United States Patent
Chen

(10) Patent No.: US 7,263,581 B2
(45) Date of Patent: Aug. 28, 2007

(54) SYSTEM AND METHOD FOR ACCESSING AND VERIFYING THE VALIDITY OF DATA CONTENT STORED IN THE CACHE MEMORY ON DISK

(75) Inventor: Chih-Wei Chen, Taipei (TW)

(73) Assignee: Inventec Corporation (TW)

( * ) Notice: Subject to any disclaimer, the term of this patent is extended or adjusted under 35 U.S.C. 154(b) by 328 days.

(21) Appl. No.: 11/096,294

(22) Filed: Mar. 31, 2005

(65) Prior Publication Data

US 2006/0224824 A1    Oct. 5, 2006

(51) Int. Cl.
*G06F 12/00* (2006.01)
*G06F 11/00* (2006.01)

(52) U.S. Cl. .............. 711/113; 711/114; 714/2

(58) Field of Classification Search ........ 711/112, 711/113, 114
See application file for complete search history.

(56) References Cited

U.S. PATENT DOCUMENTS

| | | | |
|---|---|---|---|
| 5,437,022 A * | 7/1995 | Beardsley et al. ........ | 714/6 |
| 6,578,158 B1 * | 6/2003 | Deitz et al. ............. | 714/11 |
| 6,928,514 B2 * | 8/2005 | Chatterjee et al. ....... | 711/114 |
| 7,162,587 B2 * | 1/2007 | Hiken et al. ............ | 711/135 |
| 2002/0133735 A1 * | 9/2002 | McKean et al. ........... | 714/5 |
| 2004/0268037 A1 * | 12/2004 | Buchanan et al. ......... | 711/114 |
| 2006/0083102 A1 * | 4/2006 | Ghanem et al. ........... | 365/232 |

* cited by examiner

*Primary Examiner*—Reginald Bragdon
*Assistant Examiner*—Aracelis Ruiz
(74) *Attorney, Agent, or Firm*—Peter F. Corless; Steven M. Jensen; Edwards Angell Palmer & Dodge LLP

(57) ABSTRACT

A system and a method for accessing and verifying the validity of data content stored in the cache memory on disk are proposed, which is applied in a data accessing system through the use of a master disk controller or a slave disk controller. For data accessing purposes, the master and the slave disk controllers each have a storage space in the cache memory on disk, to temporarily store and access related data. The method for accessing and verifying the validity of data content stored in the cache memory on disk includes: creating a recording area for recording access records on the disk accessed by the disk controller; reading the access record in the recording area, and determining whether the access record shows that the disk was accessed by the master controller upon power-on; wherein, if the record shows that the disk was accessed by the master disk controller, making the master disk controller access the disk with the content stored in the storage space in the cache memory of master disk controller, and, in contrast, if the record shows that the disk was accessed by the slave disk controller, after power-on, making the master disk controller treat the content stored in the storage space in the cache memory of master disk controller as invalid.

10 Claims, 3 Drawing Sheets

SYSTEM AND METHOD FOR ACCESSING AND VERIFYING THE VALIDITY OF DATA CONTENT STORED IN THE CACHE MEMORY ON DISK

FIELD OF THE INVENTION

The present invention relates to systems and methods for accessing data, and more particularly, to a system and method for accessing data content stored in the cache memory on disk under the control of the dual backup disk controller.

DESCRIPTION OF THE PRIOR ART

In a server-based network system (e.g. internet, enterprise network or intranet, etc), when problems take place, during the operation of the server, such problems will likely affect the quality of service since client computers operated by customers of the service may not have access to the server. In order to prevent this, data service providers typically need to have a so-called slave server that takes over the task of the master server when the master server is down.

In the case of a Redundant Array of Independent Drives (RAID) system, in order to prevent disruption of services when the disk controller is experiencing problems, a dual backup disk controller system is used. The master and slave disk controllers each have their data stored in the cache memory. FIG. 1 is a diagram illustrating the operation logic of the applied disk array commonly used in data accessing systems. The basic structure of such a data accessing system can also be seen in this diagram. The disk cache memory storage space labeled 30 in FIG. 1 is for the exclusive use of the master controller labeled 1 in FIG. 1. A similar relationship applies for the disk cache memory storage space 31 and the slave controller 2 in FIG. 1. The use of such a cache memory storage space helps overcome inefficiency that exists in direct data accessing systems without the presence of sufficient internal cache memory storage space.

Under normal operating conditions, controller 1 will temporarily store access commands and data acquired through the execution of the access commands in disk cache memory storage space 30. In addition, it will duplicate a copy of the temporary data stored in disk cache memory storage space 30 into disk cache memory storage space 31. Therefore, in the event that controller 1 has malfunctioned, backup controller 2 can still resume the unfinished tasks of controller 1, as shown in FIG. 1(B).

In the event that controller 2 has taken over for controller 1 because controller 1 has temporarily gone out of service, data stored in the disk labeled 3 is updated by controller 2. However, once controller 1 has recovered, it will resume its operations to disk 3 with the information stored in storage space 30 prior to malfunctioning. As such, it is very likely that controller 1 will write obsolete data over the updated data which was stored into disk 3 via controller 2 while controller 1 was out of service.

It is therefore the interest of this invention to present a solution for overcoming the inability of the current dual backup disk controller system to maintain the validity of the content stored in the cache memory on disk.

SUMMARY OF THE INVENTION

In order to solve the problems of the prior art, a primary objective of the present invention is to provide a system and a method for accessing and verifying the validity of data content stored in the cache memory on disk. This is to ensure the validity of the data content stored in the cache memory on disk under the control of the dual backup disk controller, and thus preventing the master disk controller from storing incorrect data into the cache memory on disk after recovering from a malfunction.

In order to achieve the above and other objectives, a system and method to access and verify the validity of data content stored in the cache memory on disk is provided by the present invention. The system for accessing and verifying the validity of data content stored in the cache memory on disk is used in the event that the master disk controller has malfunctioned, wherein a dual backup disk controller system is used such that the backup disk controller can takeover and resume data access and storage work that was being executed by the master disk controller prior to malfunction. For data accessing purposes, the master and slave disk controllers each have a storage space in the cache memory on disk. The system for accessing and verifying the validity of data content stored in the cache memory on disk includes: a recording area built in the disk for recording access records of the disk accessed by the disk controller; and a power-on determining program used by the master controller to read the access records in the recording area upon power-on in order to determine whether the access record show that the disk was accessed by the master controller, wherein, if the record shows that the disk was accessed by the master disk controller, the master disk controller will access the disk with the content stored in the storage space in the cache memory of the master disk controller, but if the record shows that the disk was accessed by the slave disk controller, the master disk controller will treat the content stored in the storage space in the cache memory of master disk controller as invalid after power-on.

The method for accessing data content is applied in a data accessing system through the use of the master disk controller along with at least one slave disk controller. When the master disk controller is not working, a slave disk controller will take over the data accessing task from the master disk controller. For data accessing purposes, the master and the slave disk controllers each have a storage space in the cache memory on disk to temporarily store and access related data. The method for accessing and verifying the validity of data content stored in the cache memory on disk includes the following procedures: creating a recording area for recording access records of the disk accessed by the disk controller; reading the access records in the recording area, and, upon power-on, determining whether the access records show that the disk was accessed by the master controller, wherein, if the record shows that the disk was accessed by the master disk controller, allowing the master disk controller to access the disk with the content stored in the storage space in the cache memory of master disk controller, but if the record shows that the disk was accessed by the slave disk controller, then, after power-on, the master disk controller will treat the content stored in the storage space in the cache memory of the master disk controller as invalid.

BRIEF DESCRIPTION OF THE DRAWINGS

A better understanding of the present invention can be obtained when the foregoing detailed description is considered in conjunction with the following drawings, in which.

DETAILED DESCRIPTION OF THE PREFERRED EMBODIMENT

The descriptions below of specific embodiments are to illustrate the present invention. Others skilled in the art can easily understand other advantages and features of the present invention from the contents disclosed in this specification. The present invention can be carried out or applied through different embodiments. Many details of this specification can be modified based on different viewpoints and applications yet still fall within the scope of the present invention.

Figure 1A:
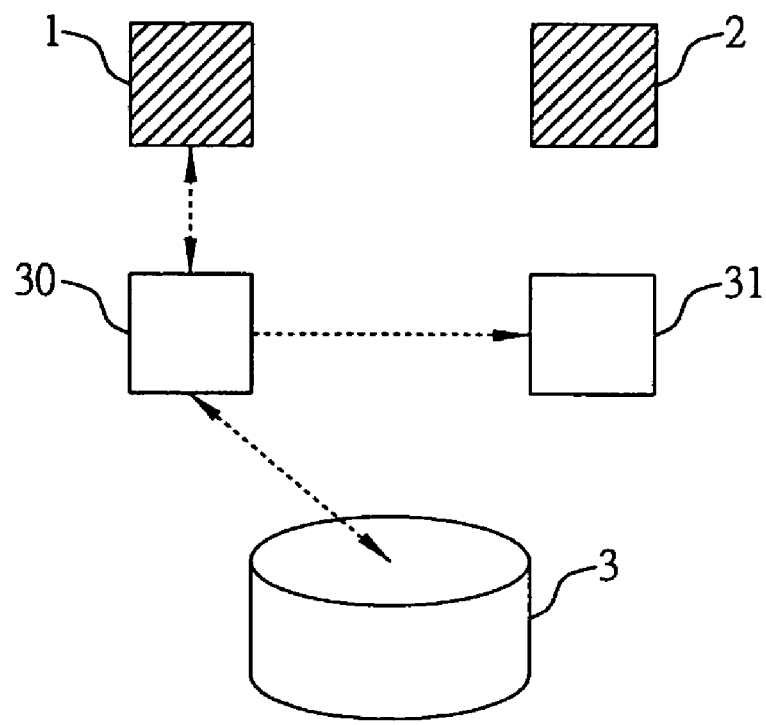
FIGS. 1(A) & 1(B) together constitute a block diagram showing the operation logic of the applied disk array commonly used in data accessing systems.
Figure 1B:
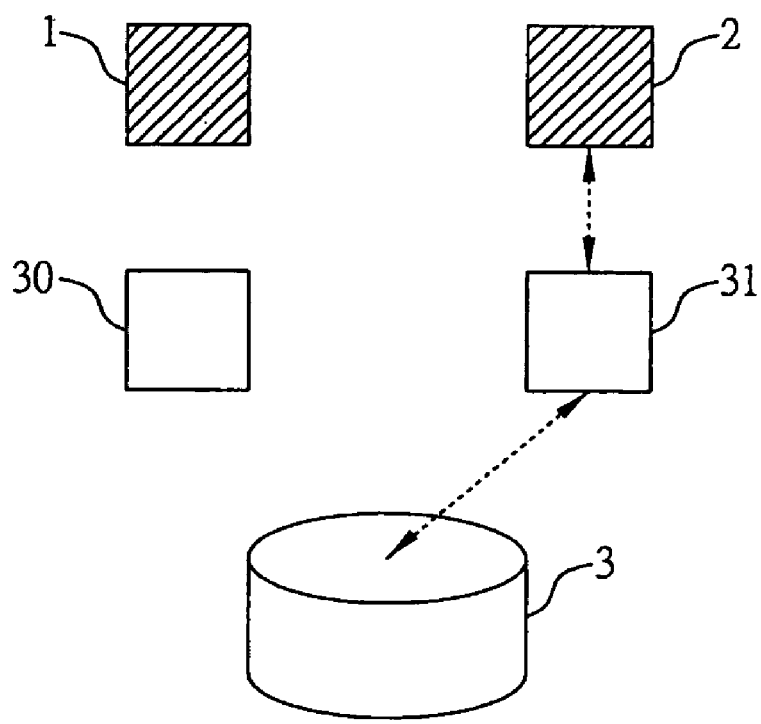
Figure 2:
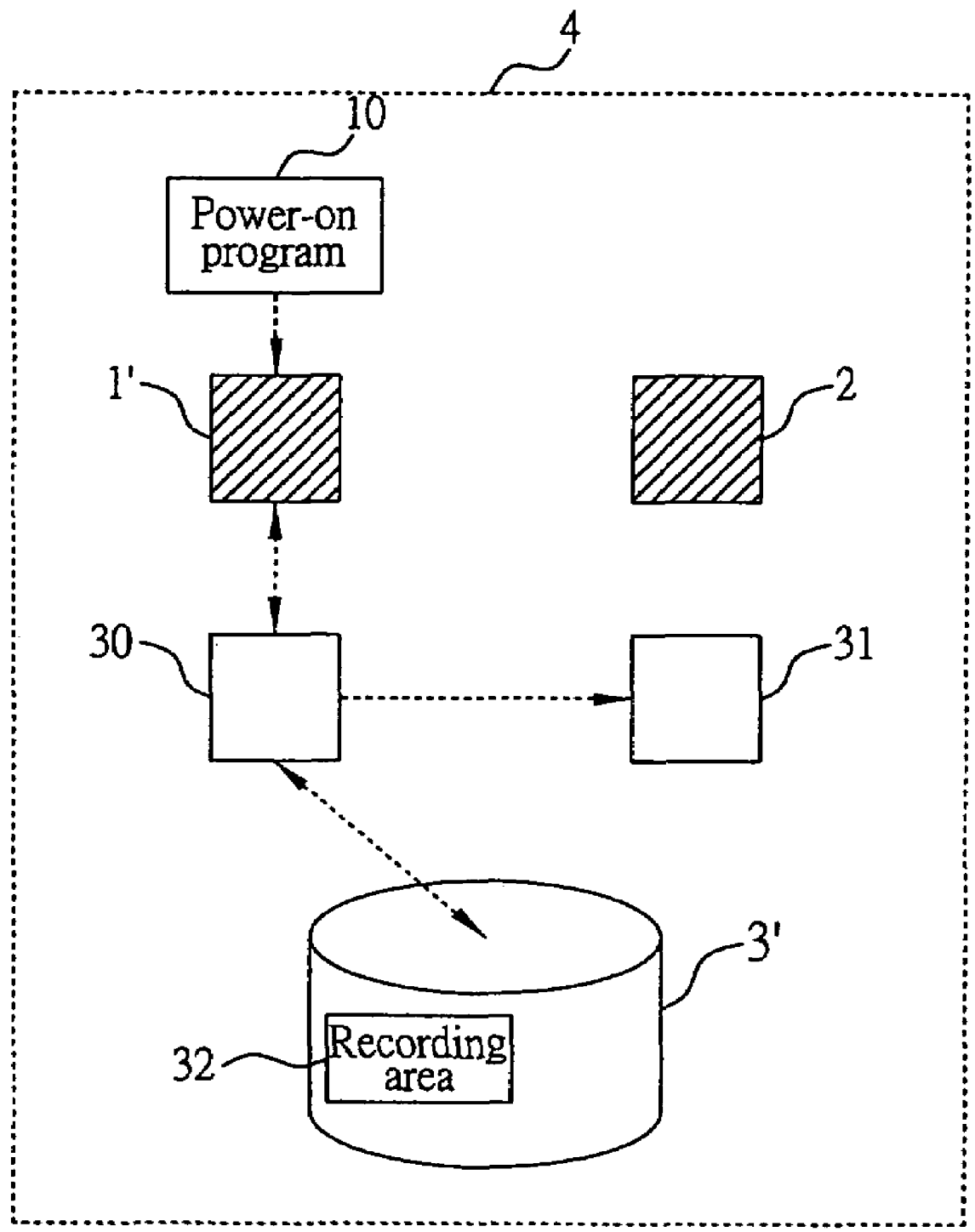
FIG. 2 is a block diagram showing the basic structure an operation according to the system for accessing and verifying the validity of data content stored in the cache memory on disk of the present invention.

FIG. 2 is a block diagram showing the basic components of the system for accessing and verifying the validity of data content stored in the cache memory on disk of the present invention. As shown in the diagram, the system for accessing and verifying the validity of data content stored in the cache memory on disk, labeled as 4, is applied in application, such as a data accessing process utilizing a RAID (Redundant Array of Independent Drives) system. In order to simplify the description, the similarity between the configuration presented in data accessing system 4 of the present embodiment and the configuration presented in the commonly used data accessing system will not be further described. Only the differences between the system of the present embodiment and the commonly used data accessing system will be detailed. In addition to the single slave disk controller labeled 2 of data accessing system 4 of the present embodiment shown in the diagram, the number of slave disk controllers can be two or more, depending on the demands of the application.

A recording area labeled 32 is built in the disk labeled 3' of the data accessing system 4 for recording the access records of the disk accessed by master disk controller 1' or slave disk controller 2. That is, when disk 3' is accessed by master disk controller 1', a verifying code, e.g. 001, representing the access record of master disk controller 1' will be stored into recording area 32. If disk 3' is accessed by slave disk controller 2, a verifying code, e.g. 002, representing the access record of slave disk controller 2 will be stored into recording area 32. Verifying codes 001 and 002 are examples only, and, of course, the coding can be varied to suit requirements. The main feature here is that separate verifying codes for master disk controller 1' or slave disk controller 2 will be stored into recording area 32 when disk 3' is accessed by master disk controller 1' or slave disk controller 2.

Under ordinary circumstances, the access record stored in recording area 32 is the access record of master disk controller 1'. The access record stored in recording area 32 will only be altered by slave disk controller 2 when master disk controller 1' has malfunctioned and disk 3' is then accessed by slave disk controller 2. Therefore, after recovering from a malfunction, master disk controller 1' will be able to determine that the slave disk controller has accessed disk 3' while the master disk controller 1' was out of order. That is, based on the access record stored in recording area 32, the validity of storage space 30 stored in the cache memory of disk will be determined. Therefore, master disk controller 1' will be prevented from uploading invalid content recorded in storage space 30 after recovering from a malfunction, thus preventing the overwriting of the correct data stored in the disk 3' which could cause incorrect data being stored into disk 3'.

A power-on determining program 10 (e.g. BIOS program) built in the memory unit (not diagramed) will be read by master disk controller 1' as mentioned above upon power-on. In order to determine whether the slave disk controller accessed disk 3' while master disk controller 1' was out of order, under command of the power-on determining program 10, the master disk controller 1' will read the access record from recording area 32 in disk 3' in advance of resuming operations (particularly write operations) to disk 3'.

Furthermore, recording area 32 built in disk 3' can be an access address pre-defined in disk 3'. Every time master disk controller 1' recovers from a malfunction and tries to access disk 3', it will be instructed to first read the access record referenced by the defined address and determine whether the verifying code belongs to master disk controller 1' itself. If the verifying code belongs to master disk controller 1', the content stored in storage space 30 in the cache memory will be valid, hence disk 3' can be accessed by master disk controller 1' with the content stored in storage space 30.

Figure 3:
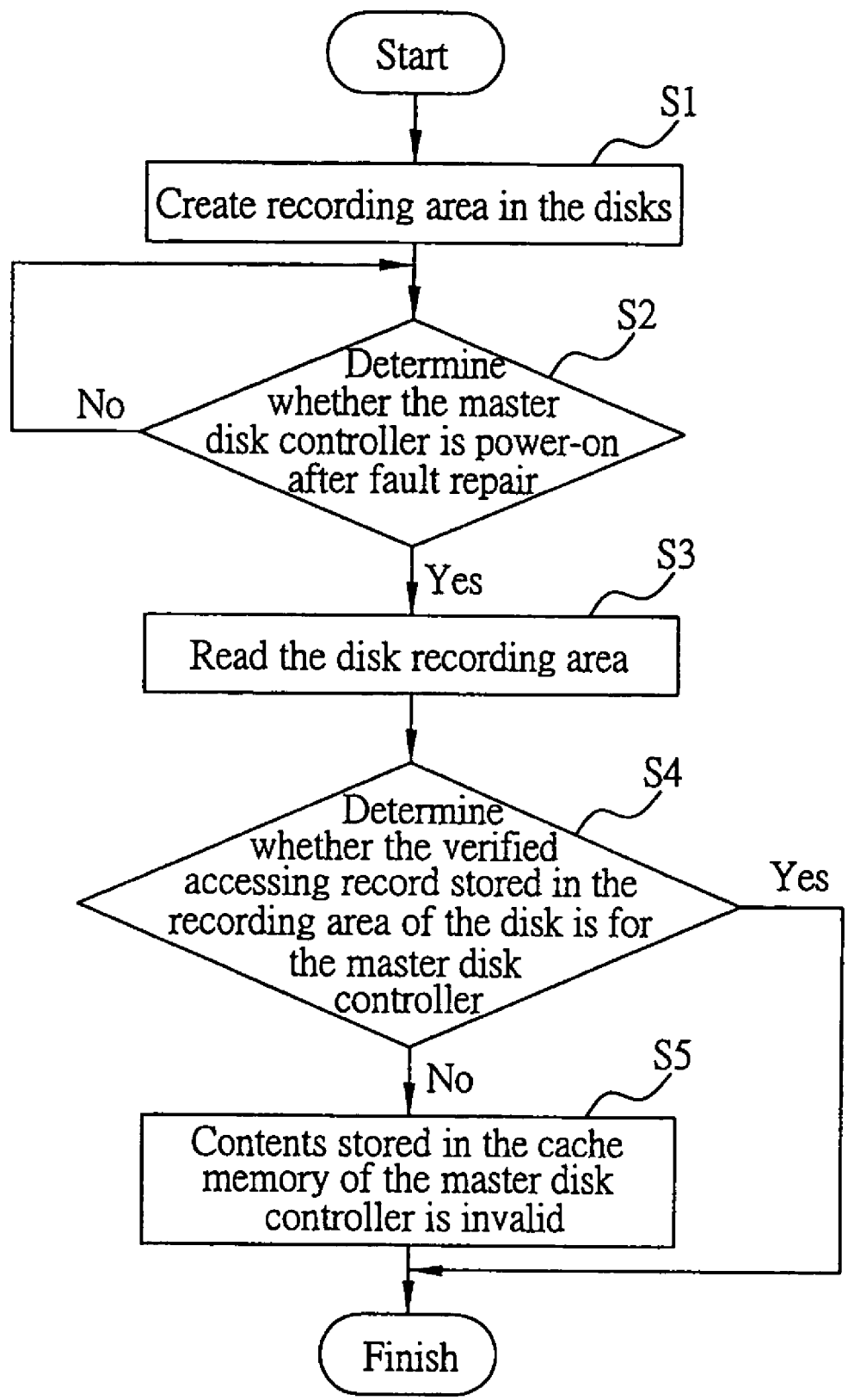
FIG. 3 is flow chart showing the basic operational procedures according to the system for accessing and verifying the validity of data content stored in the cache memory on disk of the present invention.

FIG. 3 is a flow chart showing the basic operational procedures of the system for accessing and verifying the validity of data content stored in the cache memory on disk of the present invention. As shown in the flow chart, the first step S1 creates a recording area 32 in disk 3' in advance for the purpose of keeping track of whether it was accessed by master disk controller 1' or slave disk controller 2 through the use of recording area 32, i.e. by storing the access record into recording area 32 to be used to identify the accessing source.

Step S2 determines whether the operational status of master disk controller 1' indicates that it has just recovered from a malfunction. That is, master disk controller 1' will read the power-on determining program 10 built in the memory unit upon power-on in order to determine if a slave disk controller has accessed disk 3' while master disk controller 1' was out of order. Based on the power-on determining program 10, master disk controller 1' will read the access record from recording area 32 in disk 3' in advance. If disk 3' had been accessed by a slave disk controller, the system proceeds to step S3; otherwise data accessing system 4 will continue progressing through S2 to determine the operational status of the master disk controller 1'.

In step S3, if it has been determined that the operational status of the master disk controller 1' indicates that it has just recovered from a malfunction, master disk controller 1' will be directed to read the access record stored in recording area 32 in disk 3'.

In step S4, master disk controller 1' determines whether the access record stored in recording area 32 indicates whether disk 3' was accessed by master disk controller 1'. If so, the determining process for accessing and verifying the validity of data content stored in the cache memory on disk ends and master disk controller 1' will then be allowed to access disk 3' based on the content stored in the storage space 30; otherwise, the method proceeds to step S5.

In step S5, master disk controller 1' determines whether the access record stored in recording area 32 indicates whether disk 3' was not accessed by master disk controller 1' (i.e. the access record shows that disk 3' was accessed by slave disk controller 2). If so, master disk controller 1' will treat the content stored in storage space 30 as invalid. Therefore, master disk controller 1' will not access disk 3' with the content stored in storage space 30 in the cache memory on disk. This completes the determining process for accessing and verifying the validity of data content stored in the cache memory on disk.

Therefore, when the content stored in storage space 30 in the cache memory on disk has been determined to be invalid by master disk controller 1' based on the access record stored in recording area 32 which indicates usage by slave disk controller 2, it is determined that slave disk controller 2 took over the access tasks of master disk controller 1' when it was down. Hence, disk 3' will be controlled and accessed based on the content stored in storage space 31 in the cache memory on disk, which temporarily stores commands or data for slave disk controller 2. This prevents the master disk controller from storing incorrect data into the cache memory on disk after recovering from a malfunction.

Furthermore, with reference to steps S3, S4 and S5 as previously described, these steps can be executed during any master disk controller 1' power-on state regardless of the controller's condition, such as having just recovered from a malfunction or under normal operation. In addition, if disk 3' is being accessed by master disk controller 1' for the first time, and disk 3' has not yet been accessed by slave disk controller 2, recording area 32 on disk 3' will not have recorded any access record (i.e. the record is empty), the data content stored in the cache memory on disk for master disk controller 1' will therefore be considered valid, thus master disk controller 1' will access disk 3' based on the content stored in storage space 30.

The system and method for accessing and verifying the data content stored in the cache memory on disk of the present invention by the use of access records stored in a recording area on the disk helps ensure the validity of the data content stored in the cache memory on disk in a way that can be easily accessed by the master disk controller, hence effectively solving the problems related to the validity of the data content stored in the cache memory on disk which can easily occur after access has been switched to a slave disk controller and then back to the master disk controller.

The embodiments described above are only to illustrate aspects of the present invention; it should not be construed as to limit the scope of the present invention in any way.

While the invention has been described in detail with reference to specific embodiments thereof, it will be apparent in the art that various changes and modifications can be made, and equivalents employed, without departing from the scope of the claims.

What is claimed is:

1. A system for accessing and verifying validity of data content stored in a cache memory on a disk to be used, after a master disk controller has recovered from a malfunction during which a slave disk controller has temporarily taken over data accessing work executed by the master disk controller in which two independent storage spaces allocated in the cache memory on the disk are available for the master and slave disk controllers, respectively, for data accessing purposes; the system for accessing and verifying the validity of data content stored in the cache memory of disks comprising:

a recording area built in the disk for recording records of the disk accessed by the master and slave disk controllers; and a power-on determining program used by the master disk controller to read the accessed records in the recording area upon power-on, to determine whether the accessed records show that the disk was accessed by the master controller; wherein, if the records show that the disk was accessed by the master disk controller, having the master disk controller access the disk with data content stored in a storage space in the cache memory of the master disk controller, and if the records show that the disk was accessed by a slave disk controller, having the master disk controller invalidate the content stored in the storage space in the cache memory of master disk controller after power-on.

2. The system as claimed in claim 1, wherein verifying codes for the disk controller for performing the data accessing work are stored in the recording area when the disk was accessed by either the master disk controller or the slave disk controller.

3. The system as claimed in claim 2, wherein the recording area of the disk represents an accessing address referencing data stored on the disk, wherein, when the master disk controller tries to access the disk, the master disk controller will first read the accessed records stored in the area referenced by the address to determine whether the disk was accessed by the master disk controller, and, if so, the data content stored in the storage space in the cache memory disk is considered as valid.

4. The system as claimed in claim 1, wherein the disk is a RAID (Redundant Array of Independent Drives) system.

5. The system as claimed in claim 1, wherein, after determining that the data content stored in the storage space in the cache memory disk of the master disk controller is invalid after power-on, the master disk controller will identify a slave disk controller through the use of the accessed records stored in the recording area, after which the disk will be accessed and controlled by data content stored in a temporary storage space of the associated slave disk controller.

6. A method for accessing and verifying validity of data content stored in a cache memory on a disk, the method being applied to a data accessing system through use of a master disk controller along with at least a backup disk controller, wherein the backup disk controller takes over the data accessing work from the master disk controller, when the master disk controller malfunctions, and, for data accessing purposes, separate storage spaces in the cache memory on the disk are available to the master and the backup disk controllers to temporarily store and access related data; the method for accessing and verifying the validity of data content stored in the cache memory on a disk comprising the steps of:

creating a recording area for recording accessed records identifying the disk controller accessing the disk; and making the master disk controller read the accessed records in the recording area, and, upon power-on, determining whether the accessed records show that the disk was accessed by the master disk controller, wherein, if the record shows that the disk was accessed by the master disk controller, the master disk controller will access the disk with the data content stored in the storage space in the cache memory of the master disk controller, and, after power-on, if the record shows that the disk was accessed by the backup disk controller, the master disk controller will invalidate the data content stored in the storage space in the cache memory of master disk controller as invalid.

7. The method as claimed in claim 6, wherein verifying codes identifying the disk controller performing the data accessing work are stored in the recording area when the disk is accessed by either the master controller or the backup controller.

8. The method as claimed in claim 7, wherein the recording area of the disk represents an accessing address referencing the data stored on the disk, wherein, when the master disk controller tries to access the disk, the master disk controller will first read the accessed records stored in the defined address to determine whether the disk was accessed by the master disk controller, and, if so, the data content stored in the storage space in the cache memory disk will be considered valid.

9. The method as claimed in claim 8, wherein the disk is a RAID (Redundant Array of Independent Drives) system.

10. The method as claimed in claim 6, wherein, after power-on and determining that the data content stored in the storage space in the cache memory disk of the master disk controller is invalid, the master disk controller will identify the backup disk controller through the use of accessed records stored in the recording area, after which the disk will be accessed and controlled by data content stored in a temporary storage space of the corresponding backup disk controller.

* * * * *